A3 US009497314B2

(12) United States Patent
Milstein et al.

(10) Patent No.: US 9,497,314 B2
(45) Date of Patent: Nov. 15, 2016

(54) MINING DATA FOR SERVICES

(75) Inventors: David Milstein, Redmond, WA (US);
Kuansan Wang, Bellevue, WA (US);
Linda Criddle, Kirkland, WA (US);
Lon-Chan Chu, Redmond, WA (US);
Michael D. Malueg, Renton, WA (US);
Scott C. Forbes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1047 days.

(21) Appl. No.: 11/401,022

(22) Filed: Apr. 10, 2006

(65) Prior Publication Data

US 2007/0237149 A1 Oct. 11, 2007

(51) Int. Cl.
*H04M 3/22* (2006.01)
*H04M 7/00* (2006.01)
*G10L 15/26* (2006.01)

(52) U.S. Cl.
CPC ............ *H04M 3/2281* (2013.01); *G10L 15/26* (2013.01); *H04M 7/006* (2013.01)

(58) Field of Classification Search
CPC ......... H04M 3/2281; H04M 2201/40; H04M 3/42068; H04M 3/4211; H04M 3/4878; H04M 7/006; G10L 5/26; H04W 4/00
USPC ............ 370/351–356, 392; 707/1, 101, 3, 5; 704/235, 246; 379/265.02
See application file for complete search history.

(56) References Cited

U.S. PATENT DOCUMENTS

| | | | |
|---|---|---|---|
| 6,014,647 A * | 1/2000 | Nizzari et al. ................... 705/39 |
| 6,411,683 B1 * | 6/2002 | Goldberg et al. .......... 379/88.01 |
| 6,721,704 B1 * | 4/2004 | Strubbe et al. ............... 704/270 |
| 6,829,231 B1 | 12/2004 | Wilson |
| 7,010,526 B2 * | 3/2006 | Denesuk et al. |
| 7,191,129 B2 * | 3/2007 | Brown et al. .................. 704/235 |
| 7,277,532 B2 * | 10/2007 | Locke et al. ............. 379/112.01 |
| 7,318,031 B2 * | 1/2008 | Bantz et al. ................... 704/251 |
| 7,593,927 B2 * | 9/2009 | MacLennan et al. |
| 7,720,681 B2 | 5/2010 | Milstein et al. ............... 704/244 |
| 2002/0016786 A1 * | 2/2002 | Pitkow et al. ..................... 707/3 |
| 2002/0123891 A1 * | 9/2002 | Epstein ................. G10L 15/197 704/235 |

(Continued)

FOREIGN PATENT DOCUMENTS

| CN | 1496522 | 5/2004 |
|---|---|---|
| JP | 2001-237968 A | 8/2001 |

(Continued)

OTHER PUBLICATIONS

European Supplemental Search Report, issued on Jan. 7, 2010, in EP Appl. No. 07752907.1, 8 pgs.

(Continued)

*Primary Examiner* — Khaled Kassim
(74) *Attorney, Agent, or Firm* — John Jardine; Dan Choi; Micky Minhas

(57) ABSTRACT

Generally described, the present invention provides the ability to process digital voice conversations to identify data packets containing content of interest and to further process the identified data packets. More specifically, mining profiles may be developed identifying particular types of content that is to be mined and further identifying what is to be done when data packets containing such content is located. A system may search a digital voice conversation for the data packets containing the content and perform processing on the data packets once identified.

19 Claims, 15 Drawing Sheets

(56) References Cited

U.S. PATENT DOCUMENTS

| | | | |
|---|---|---|---|
| 2002/0169606 A1* | 11/2002 | Bantz et al. | 704/235 |
| 2003/0023730 A1 | 1/2003 | Wengrovitz | |
| 2003/0063072 A1 | 4/2003 | Brandenberg et al. | 345/173 |
| 2003/0140159 A1 | 7/2003 | Campbell | |
| 2003/0154072 A1* | 8/2003 | Young et al. | 704/9 |
| 2003/0212675 A1* | 11/2003 | Denesuk et al. | 707/5 |
| 2004/0002970 A1* | 1/2004 | Hur | 707/3 |
| 2004/0049699 A1* | 3/2004 | Griffith et al. | 713/201 |
| 2004/0083101 A1 | 4/2004 | Brown | |
| 2004/0230467 A9* | 11/2004 | Gailey et al. | 705/10 |
| 2004/0249650 A1* | 12/2004 | Freedman et al. | 705/1 |
| 2005/0010411 A1* | 1/2005 | Rigazio et al. | 704/246 |
| 2005/0091328 A1* | 4/2005 | Saeidi | 709/206 |
| 2005/0216269 A1* | 9/2005 | Scahill et al. | 704/270.1 |
| 2006/0053010 A1 | 3/2006 | Chapman et al. | 704/235 |
| 2006/0085750 A1* | 4/2006 | Easton, et al. | 715/708 |
| 2006/0149700 A1* | 7/2006 | Gladish et al. | 707/1 |
| 2006/0153357 A1* | 7/2006 | Acharya et al. | 379/266.01 |
| 2006/0233347 A1* | 10/2006 | Tong et al. | 379/265.06 |
| 2006/0262919 A1* | 11/2006 | Danson et al. | 379/265.02 |
| 2006/0262920 A1* | 11/2006 | Conway et al. | 379/265.02 |
| 2006/0265090 A1* | 11/2006 | Conway et al. | 700/94 |
| 2007/0214164 A1* | 9/2007 | MacLennan et al. | 707/101 |
| 2008/0260122 A1* | 10/2008 | Conway et al. | 379/112.01 |
| 2009/0125332 A1* | 5/2009 | Martin | 705/3 |

FOREIGN PATENT DOCUMENTS

| | | | |
|---|---|---|---|
| JP | 2002-033826 | 1/2002 | |
| JP | 2002-218016 | 8/2002 | H04M 1/00 |
| JP | 2003-115951 | 4/2003 | H04M 11/08 |
| JP | 2004-129168 | 4/2004 | H04M 11/00 |
| JP | 2001-237969 | 8/2011 | H04M 3/487 |
| RU | 44841 U1 | 3/2005 | |
| RU | 2257681 C2 | 7/2005 | |
| RU | 2004106595 A | 8/2005 | |
| WO | 2006/015344 | 9/2006 | |

OTHER PUBLICATIONS

Office Action issued Jul. 2, 2010, in CN Appl. No. 200780012760.2, w/Translation.
Office Action issued Jan. 25, 2011, in CN Appl. No. 200780012760.2, w/Translation.
Office Action issued Nov. 3, 2010, in RU Appl. No. 2008140138, w/Translation.
Office Action issued Oct. 7, 2011, in JP Appl. No. 2009-505367, w/Translation.
Office Action issued Jun. 10, 2011, in EP Appl. No. 07752907.1.
European Supplemental Search Report issued Apr. 27, 2012, in EP Appl. No. 12152085.2, 7 pgs.
Office Action issued Apr. 27, 2012, in JP Appl. No. 2009-505367, w/Translation.
Sturm, J., et al.; "Effective error recovery strategies for multimodal form-filling applications"; Speech Communication, Elsevier Science Publishers, Mar. 1, 2005.
Office Action issued Apr. 23, 2013, in KR Appl. No. 10-2008-7024743, w/Translation.
European Supplemental Search Report issued Aug. 30, 2012, in EP Appl. No. 12152085.2.
Sasaki, M., et al.; "Interactive Agent using In-Vehicle Profiles" 50 MPEG Meeting; 06-129-1999—Oct. 19, 1999; Maui; (Motion Pictureexpert Group or ISO/IEC JTC1/SC29/WG11), No. M5309, Nov. 26, 1999, XP030034498; ISSN: 0000-0299.
Korean Notice of Allowance Received for Korea Republic of (KR) Patent Application No. 10-2008-7024743, Mailed Date: Nov. 8, 2013, Filed Date: Mar. 9, 2007, 2 Pages. (w/o English Translation).
"Notice of Allowance Issued in Russia Patent Application No. 2008140138", Mailed Date: Apr. 26, 2011, 13 Pages.
"Office Action Issued in Indian Patent Application No. 4688/CHENP/2008", Mailed Date: Aug. 29, 2015, 3 Pages
"International Search Report & Written Opinion Issued in PCT Patent Application No. PCT/US2007/006241", Mailed Date: Aug. 17, 2007, 7 Pages.
"International Preliminary Report on Patentability Issued in PCT Patent Application No. PCT/US2007/006241", Mailed Date: Oct. 23, 2008, 6 Pages.

* cited by examiner

MINING DATA FOR SERVICES

BACKGROUND

Generally described, an Internet telephony system provides an opportunity for users to have a call connection with enhanced calling features compared to a conventional telephony system. In a typical Internet telephony system, often referred to as Voice over Internet Protocol (VoIP), audio information is processed into a sequence of data blocks, called packets, for conversations utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of conversations, ability to establish and control multimedia communication, and the like. VoIP technology will likely continue to gain favor because of its ability to provide enhanced calling features and advanced services.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, the present invention provides the ability to process digital voice conversations to identify data packets containing content of interest within and associated with that conversation and to further process the identified data packets. More specifically, mining profiles may be developed that identify particular types of content that are to be mined and further identifying what is to be done when data packets containing such content is located. A system may search a digital voice conversation for the data packets containing the content and perform processing on the data packets once identified.

In accordance with one aspect, a method for mining data packets from a digital voice conversation is provided. A mining profile identifying the type of content that is to be mined from the digital voice conversation may be selected. As data packets are received, by any one or more of a client device, service provider, server (on or off premises) or third party, the data packets may be quickly reviewed to determine if they potentially contain content worth mining. For example, a data packet may contain a header identifying if the data packet may contain content worth mining. If it is determined that the data packet may contain content worth mining, the data packet may be analyzed to determine if it contains content relevant to the mining profile.

In accordance with another aspect, a computer-readable medium having computer executable components for processing mined data packets is provided. The computer-readable medium includes a mined data packet management component that is configured to identify data packets of a conversation that are relevant to one or more mining profiles. A mined data packet alteration component may also be included that determines if mined data packets, or the contents thereof, are to be altered, and if so, how they are to be altered. Additionally, a mined data packet processing component configured to perform processing of mined data packets is also included.

In accordance with another aspect, a method for providing additional information related to content of a digital voice conversation is provided. The method includes processing a data packet of the conversation to identify content relevant to a mining profile and obtaining information relating to the identified content. For example, if the identified content is regarding "shoes," the method may obtain sales information for shoes and provide that information either real-time or at a later point in time.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to the identification, extraction, and further use of content contained in a digital voice conversation, such as a Voice over Internet Protocol (VoIP) conversation. More specifically, the present invention relates to the "mining" of data from a conversation and/or from information related to a conversation. "Mining" or "mining services" as used herein is the processing of a conversation to identify data (conversation and/or contextual) of interest. Mining may be performed during a conversation on data as it is being exchanged. Alternatively, mining may be performed on historical, or stored data (such data may relate to events or actions that have happened in the past, are currently happening, or will happen in the future). The identified data, referred to herein as "mined data," may be used by other services or applications, stored, forwarded, extracted from the conversation, replaced, supplemented with additional data, etc. Similar to mining, processing of mined data may be done real-time during a conversation. Alternatively, or in addition thereto, mined data may be stored and post-processed.

One technique for assisting in the mining of data is through the utilization of classes and attributes defined by "structured hierarchies" for representing contextual information over a conversation channel in an Internet Protocol (IP) network environment. "Structured hierarchies," as used herein, are predefined organizational structures for arranging contextual information to be exchanged between two or more VoIP devices. For example, structured hierarchies can be defined by hierarchical organizations of various classes and attributes, such as XML namespaces.

Figure 1:
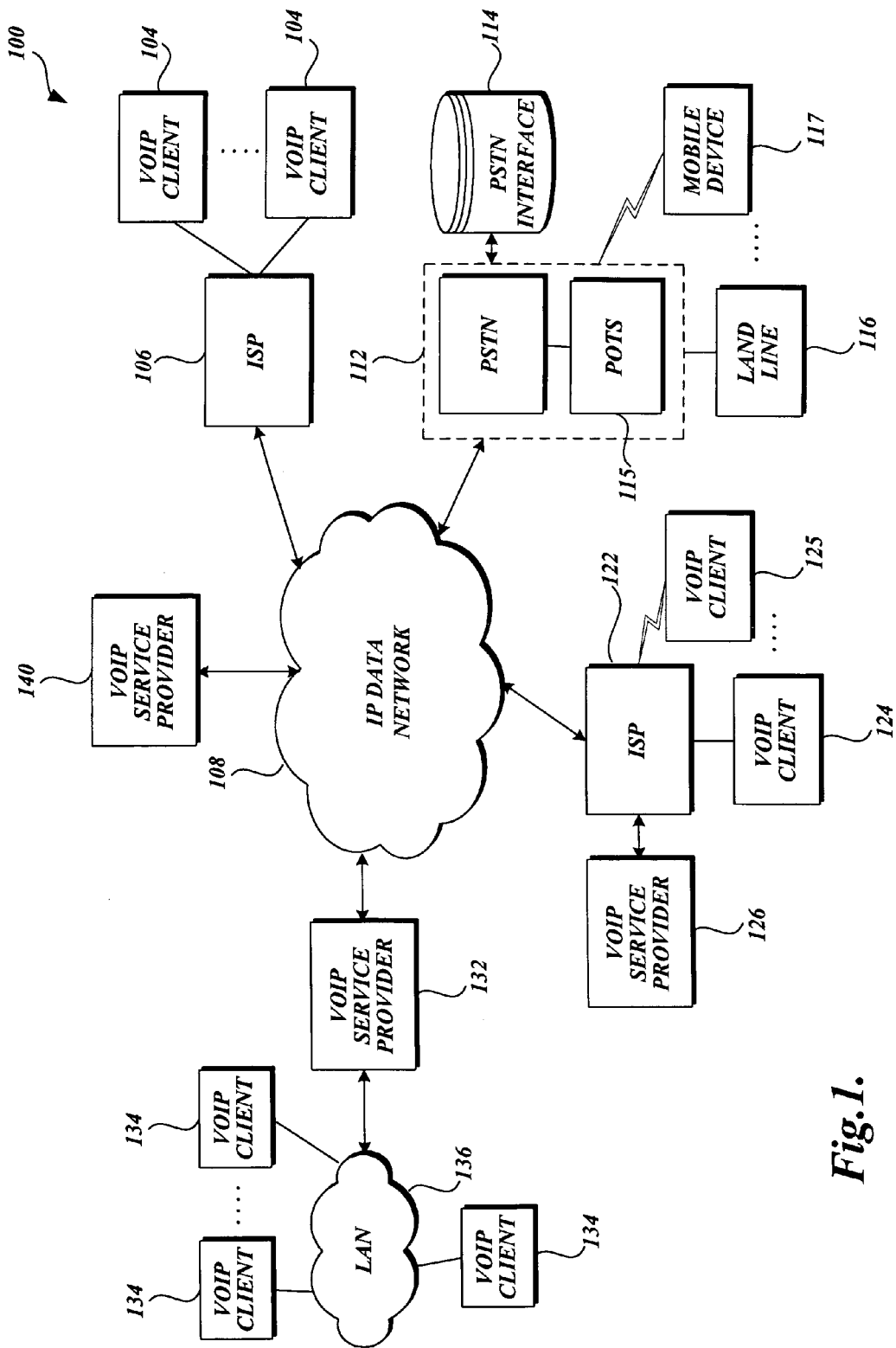
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices, and a unique VoIP client identifier. For example, a single individual, five associated VoIP devices, and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108, such as the Internet, a wide area network ("WAN"), a local area network ("LAN"), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, data may be mined from a conversation by a client, client device, service provider, a third party service, or any combination thereof. In one embodiment, one or more "mining profiles" may be defined for each client in a conversation and/or for third parties (e.g., service providers). A "mining profile" specifies types of data/content that is of interest to a client and/or a third party and what is to be done with that data/content once identified. For example, a client may create a mining profile that indicates that they are interested in shoes. That voice profile may be used to process a conversation and mine data packets that include discussions about shoes. The mined data packets may then be further processed to determine that the conversation is/was about Nike® shoes, and additional information regarding Nike® shoes (e.g., sales of Nike® shoes) may be obtained and provided.

The IP telephony environment 100 may also include third party VoIP service providers 140. The VoIP service providers 126, 132, 140 may provide various calling features, such as incoming call-filtering, text data, voice and media data integration, mining services, and integrated data transmission as part of a VoIP call conversation. The VoIP service providers 126, 132, 140 may also generate, maintain, and provide mining profiles for clients communicating in a call conversation to assist in identifying data to be mined. As an alternative, or in addition thereto, VoIP clients 104, 124, 125, 136 may create, maintain, and provide mining profiles.

VoIP service providers 132 may be coupled to a private network, such as a company LAN 136, providing IP telephone services (e.g., internal calls within the private network, external calls outside of the private network, and the like), and multimedia data services to several VoIP clients 134 communicatively connected to the company LAN 136. Similarly, VoIP service providers, such as VoIP service provider 126, may be coupled to Internet service provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a Public Switch Telephone Network (PSTN) 112. A PSTN interface 114, such as a PSTN gateway, may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional devices, such as land line 116, may request a connection with the VoIP client based on the unique VoIP identifier of that client, and the appropriate VoIP device associated with the VoIP client will be used to establish a connection. In one example, an individual associated with the VoIP client may specify which device is to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any number and combination of suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
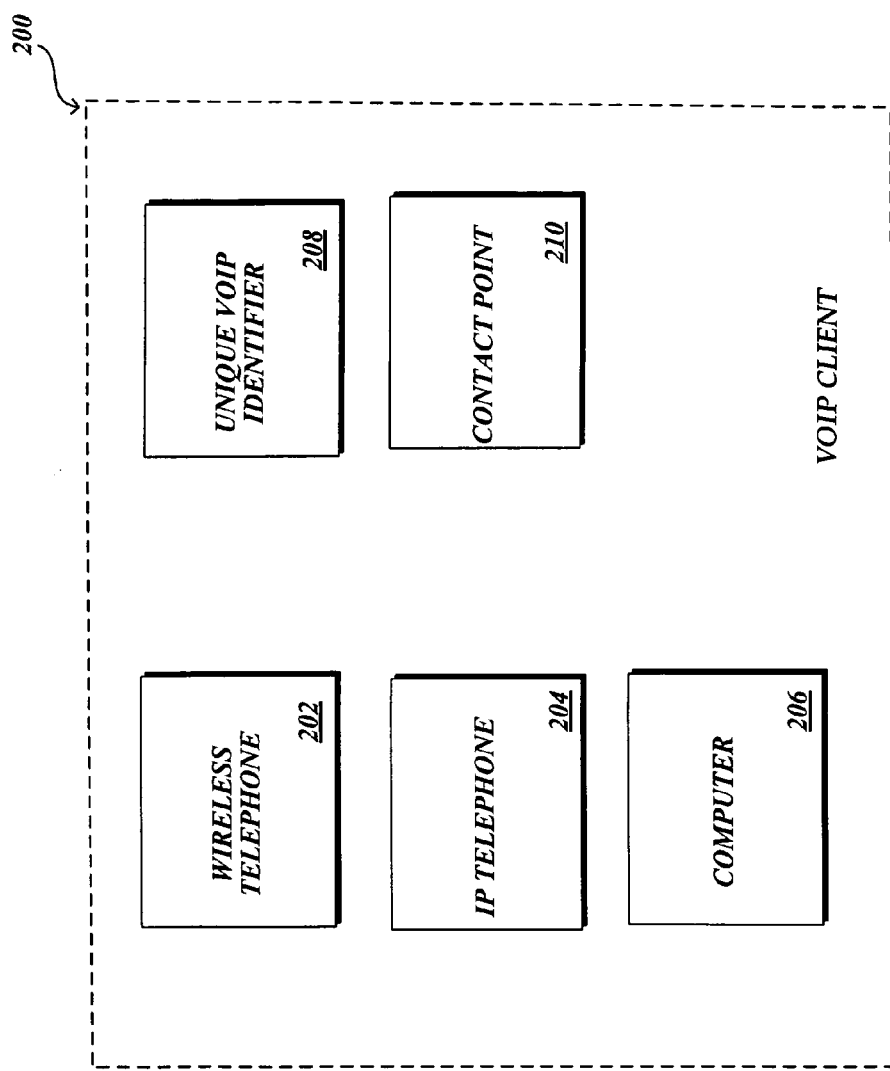
FIG. 2 is a block diagram illustrative of various VoIP devices corresponding to a VoIP client in accordance with an aspect of the present invention.

Referring now to FIG. 2, a block diagram illustrating an exemplary VoIP client 200 that includes several VoIP devices and a unique VoIP identifier in accordance with an embodiment of the present invention is shown. Each VoIP device 202, 204, 206 may include a storage that is used to maintain voice messages, address books, client specified rules, voice profiles, mining profiles, etc. Alternatively, or in addition thereto, a separate storage, maintained, for example, by a service provider, may be associated with the VoIP client and accessible by each VoIP device that contains information relating to the VoIP client. In an embodiment, any suitable VoIP device, such as a wireless phone 202, an IP phone 204, or a computer 206 with proper VoIP applications, may be part of the VoIP client 200. The VoIP client 200 also maintains one or more unique VoIP identifier(s) 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiments, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company that is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS device using a personal computer (VoIP device), the VoIP client identification number in conjunction with an IP address of the personal computer will eventually be converted into a telephone number recognizable in PSTN.

Figure 3:
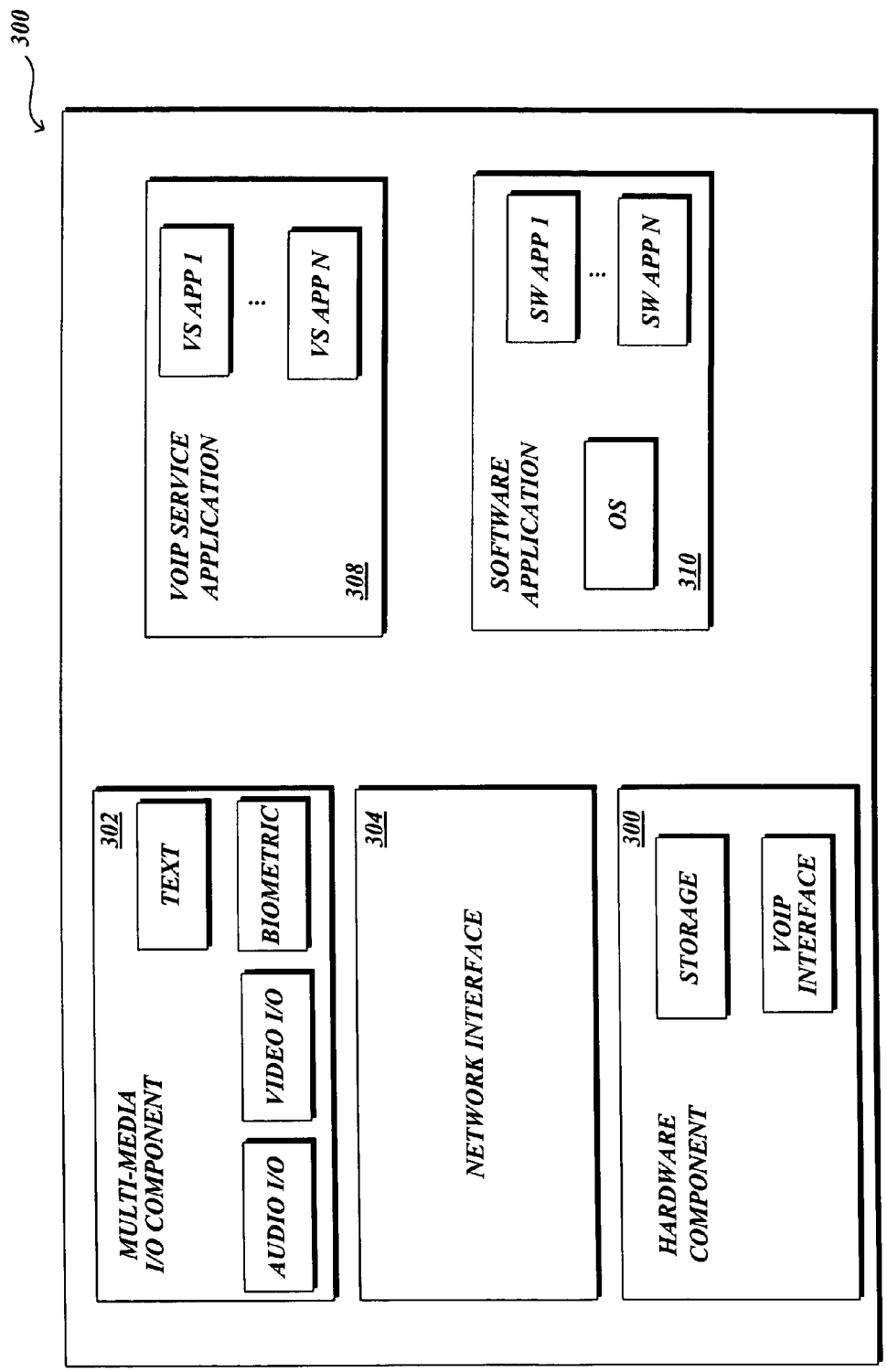
FIG. 3 is a block diagram illustrative of various components associated with a VoIP client device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting, and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components, such as a microphone, a video camera, a display screen, a keyboard, user biometric recognition devices, and the like. The multimedia input/output component 302 may also receive and transmit multimedia data via the network interface component 304. The network interface component 304 may support interfaces, such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage, such as read-only memory devices (ROM), random access memory (RAM), hard drives, optical drives, and the like. The storage may be configured to store program instructions for controlling the operation of an operating system and/or one or more applications and to store contextual information related to individuals (e.g., mining profiles) associated with the VoIP client in which the device is included. In one embodiment, the hardware component 306 may include a VoIP interface card which allows non-VoIP client devices to transmit and receive a VoIP conversation.

The device 300 may further include a software application component 310 for the operation of the device 300 and a VoIP Service application component 308 for supporting various VoIP services. The VoIP service application component 308 may include applications, such as data packet assembler/disassembler applications, a structured hierarchy parsing application, audio Coder/Decoder (CODEC), video CODEC, and other suitable applications for providing VoIP services. The software application component 300 may also include a mining component that utilizes one or more mining profiles to mine data from a conversation. A client may maintain and use more than one mining profile. For example, different mining profiles, identifying different types of content to be mined, may be established for personal, business, family, friends, etc., and selected and used based on the conversation. The mining component may utilize technologies, such as, but not limited to, speech recognition, keyword searching, image recognition, voice recognition, contextual data searching, and/or packet analysis, to mine data from a conversation.

Figure 4A:
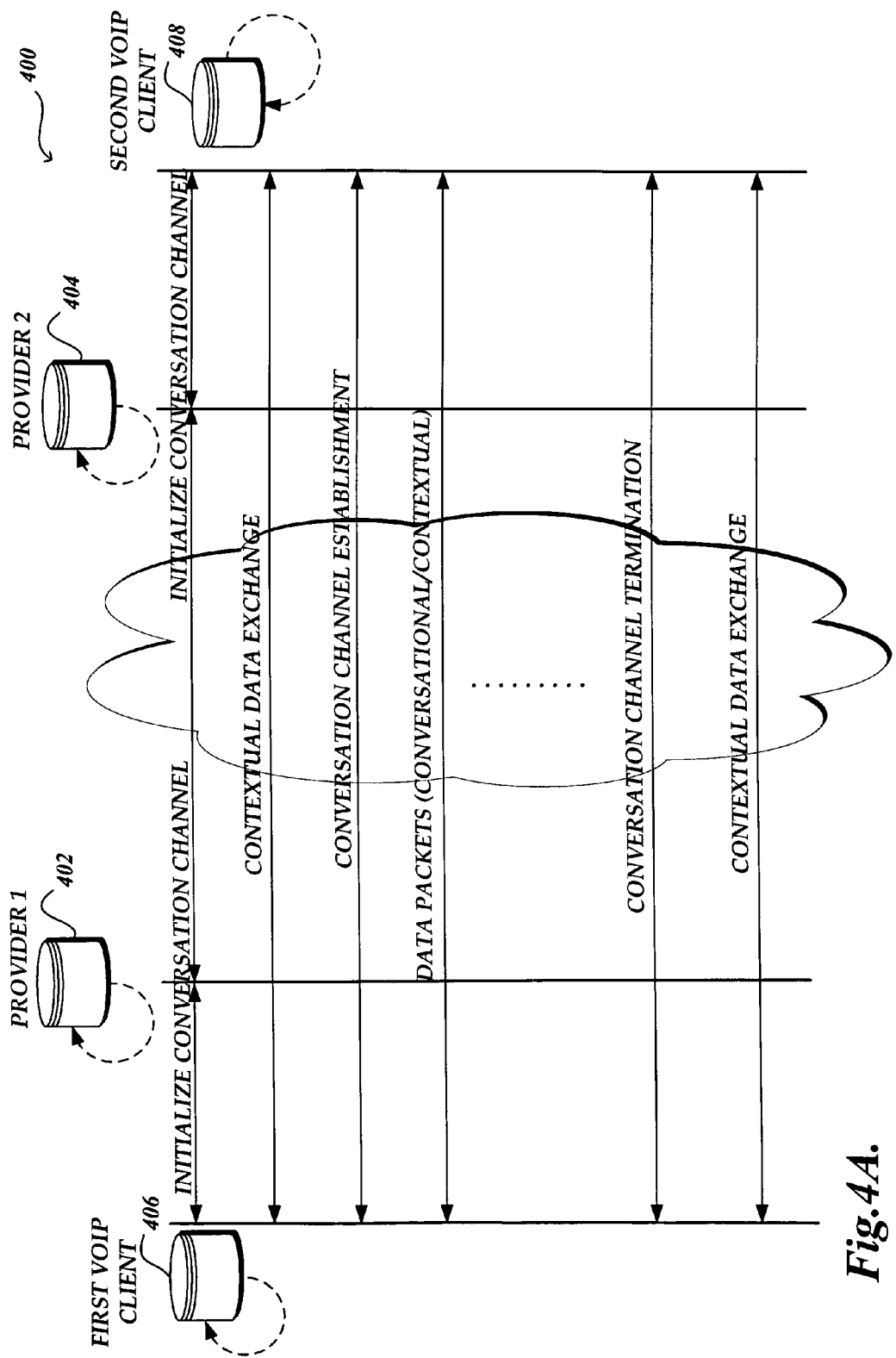
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel in accordance with an embodiment of the present invention is shown. While the example provided herein focuses on communication between two VoIP clients, it will be appreciated that conversations may be between any number of VoIP clients. During a connection set-up phase, a VoIP device of a first VoIP client 406 requests to initiate a conversation channel with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 406.

While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer-to-peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only include one VoIP device. Accordingly, the discussion provided herein will refer to connection of the two VoIP devices. The individual using the device of the first VoIP client 406 may select or enter the unique VoIP identifier of the client that is to be called. If mining is to be done by the device of the first client, an appropriate mining profile may be selected. The mining profile may be manually selected by the individual. Alternatively, the mining profile may be automatically selected based on, for example, the device being used, the client being called, the location from which the call is being made, the time of day, etc.

Provider 1 402 receives the request from the device of the first VoIP client 408 and determines a terminating service provider (e.g. Provider 2 404 of the second VoIP client 408) based on the unique VoIP identifier included in the request. Additionally, if Provider 1 402 is to mine data, the appropriate mining profile(s) is selected using any of the techniques discussed above. The request is then forwarded to Provider 2 404. This call initiation will be forwarded to the device of the second VoIP client. A conversation channel between the device of the first VoIP client 406 and a device of the second VoIP client 408 can then be established. If either, or both, Provider 2 404, or the second VoIP client are to mine data, the appropriate mining profile(s) for the second client may be identified for the conversation.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, the VoIP client 408 being called, and optionally, third-party services.

Available media types, rules of the calling client and the client being called, appropriate mining profiles of the calling client and the client being called, and the like may also be part of the contextual information that is exchanged during the connection set-up phase. The contextual information may be processed and collected by one of the devices of the first VoIP client 406, one of the devices of the second VoIP client 408, and/or by VoIP service providers (e.g. Provider 1 402 and Provider 2 404) depending on the nature of the contextual information. In one embodiment, the VoIP service providers 402, 404 may add and/or delete some information to/from the client's contextual information before forwarding the contextual information.

In response to a request to initiate a conversation channel, the second VoIP client 408 may accept the request for establishing a conversation channel or execute other appropriate actions, such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices. Some or all of the exchanged data packets may be mined for data matching requirements of the mining profiles.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
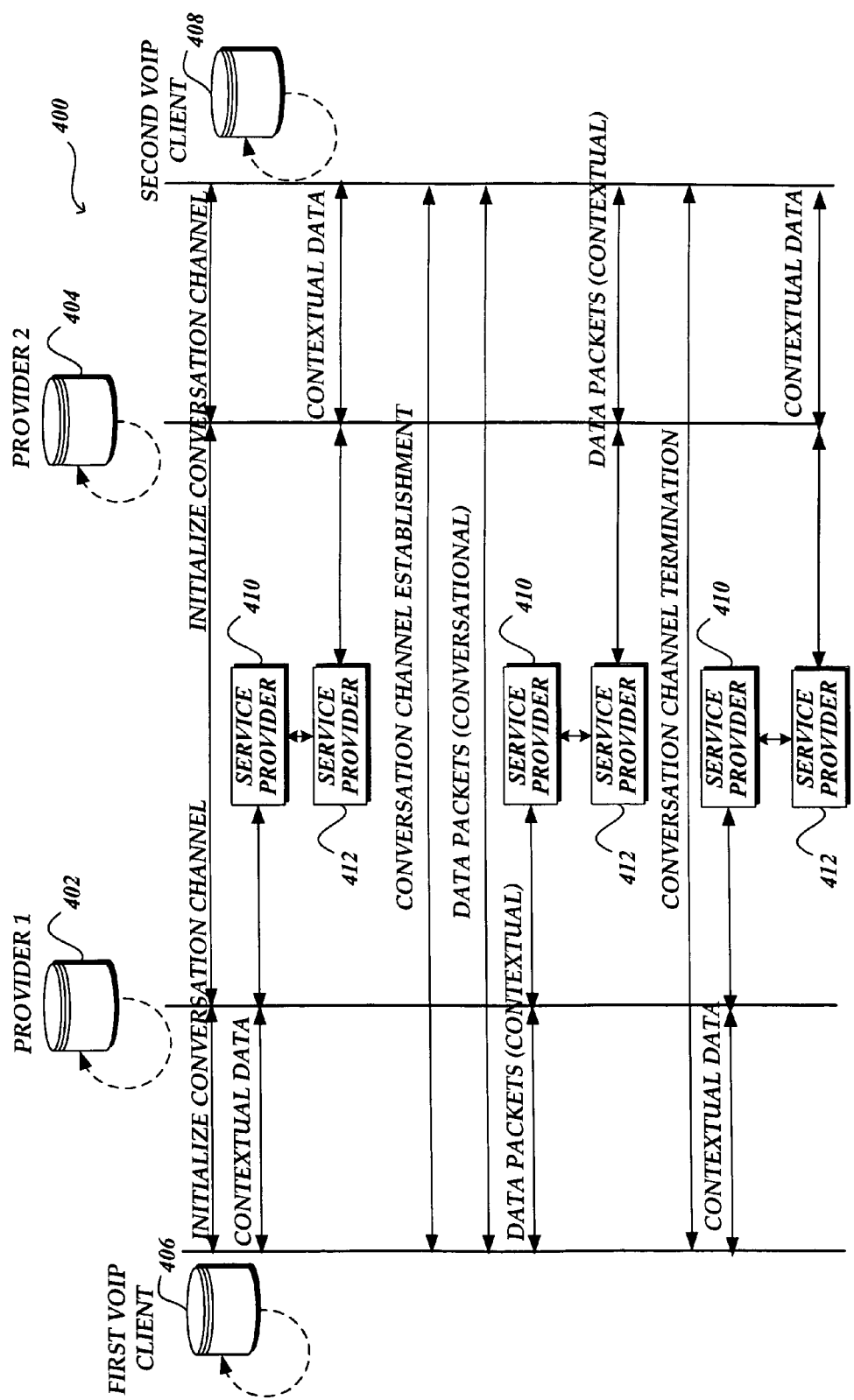

FIG. 4B is a block diagram illustrative of a conversation flow 400 between devices of two VoIP clients via several service providers in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408. As with the example described above with respect to FIG. 4A, any of or more of the first VoIP client 406, Provider 1 402, Provider 2 404, and/or the second VoIP client 408 may be specified to mine data from the conversation. As such, the device(s) may identify, and optionally exchange, appropriate mining profiles for the conversation with other devices.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2) depending on the nature of the contextual information. For example, mining profiles may be selected and received by the service providers 402, 404 and only temporarily provided to the devices. Further, third party service provider(s) 410, 412 may also maintain mining profiles for use in mining data from the conversation. For example, the first VoIP client may have requested that a third party provider mine all conversations for particular content. Similarly, the service provider 410, 412 may be a company from which the first VoIP client is calling or a company in which the second VoIP client 408 is located. The companies may have mandatory mining profiles that are used to mine conversations for particular keywords that relate to trade secret information of that company. Upon identification of a conversation that includes those keywords, the mined data may be stored for later use and other processing may be performed (e.g., terminating the conversation, requiring further authentication/permission settings before continuing, etc.). In one embodiment, any of Provider 1 402, Provider 2 404, and third party service provider 410, 412 may add, modify, and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party service providers 410, 412 from Provider 1 402, Provider 2 404, or from either VoIP client 406, 408. Further, the forwarded contextual and/or conversation data packets may be exchanged among various third party service providers 410, 412. Any of the VoIP clients 406, 408, service providers 402, 404, or the third party service providers 410, 412 may mine the contextual and/or conversation data packets based on selected mining profiles.

Figure 5:
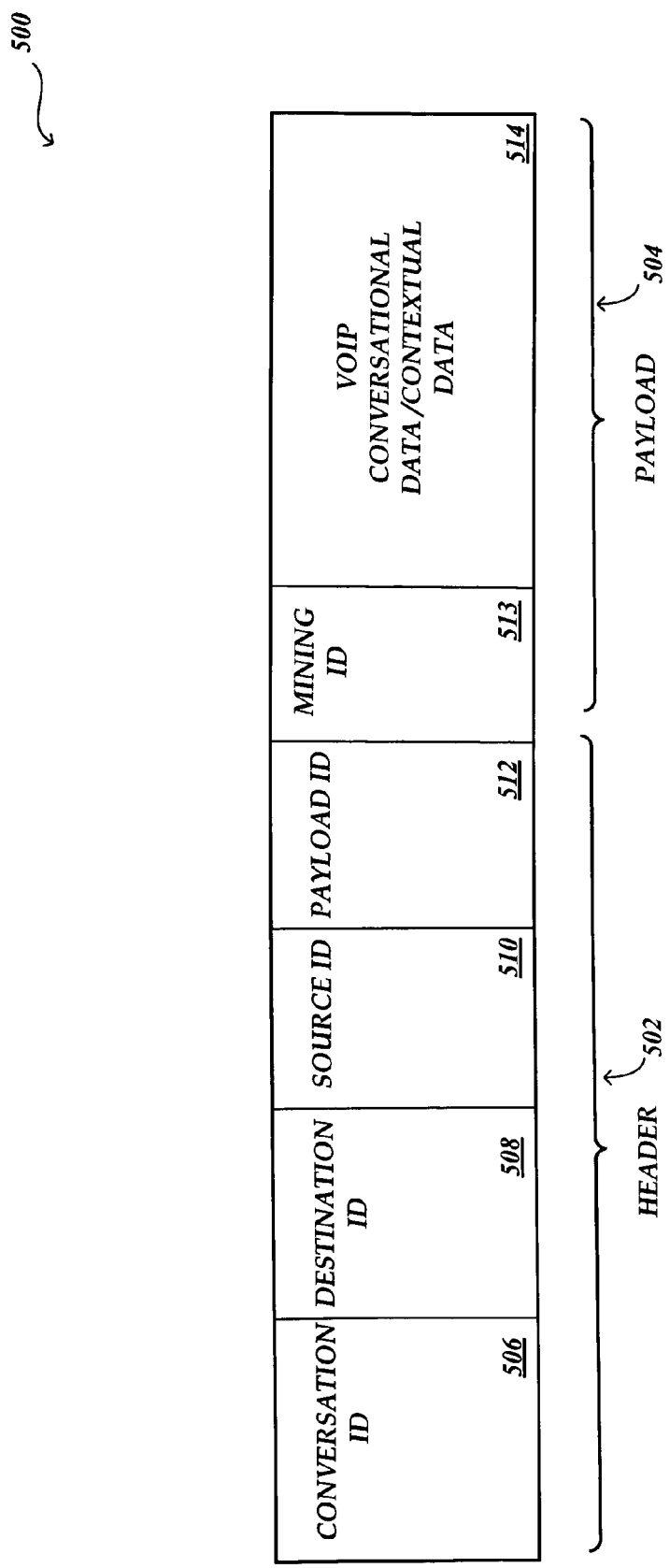
FIG. 5 is a block diagram of a data packet used over a conversation channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), a mining ID 513 for identifying that the payload may contain content worth mining, individual ID (not shown) for identifying the individual for which the conversation data is related, and the like. In an alternative embodiment, the header 502 may contain information regarding Internet protocol versions and payload length, among others. The payload 504 may include conversational or contextual data relating to an identified conversation. As will be appreciated by one of ordinary skill in the art, additional headers may be used for upper layer headers, such as a TCP header, a UDP header, and the like.

In one embodiment of the present invention, a structured hierarchy may be predefined for communicating contextual information over a VoIP conversation channel. The contextual information may include any information relating to VoIP clients, VoIP client devices, conversation channel connections (e.g., call basics), conversation context (e.g., call context), and the like. More specifically, the contextual information may include individual client mining profiles or mining profile identifiers, client rules, client's location (e.g., user location, device location, etc), biometrics information, the client's confidential information, VoIP client device functionality, VoIP service providers information, media type, media parameters, calling number priority, keywords, information relating to application files, and the like. The contextual information may be processed and collected at each VoIP client and/or the VoIP service providers depending on the nature of the contextual data.

In one aspect, the VoIP service providers may add, modify, and/or delete a VoIP client's contextual data before forwarding the contextual information. For example, a client's confidential information may be deleted by the VoIP service provider associated with that client unless the client authorizes such information to be transmitted. In some cases, a minimal amount of contextual information is transmitted outside of an intranet network. Additionally, as discussed below, some intranet networks, such as an office, may implement mining profile rules indicating what may be mined from a conversation and what may be included in a conversation for potential mining.

Figure 6:
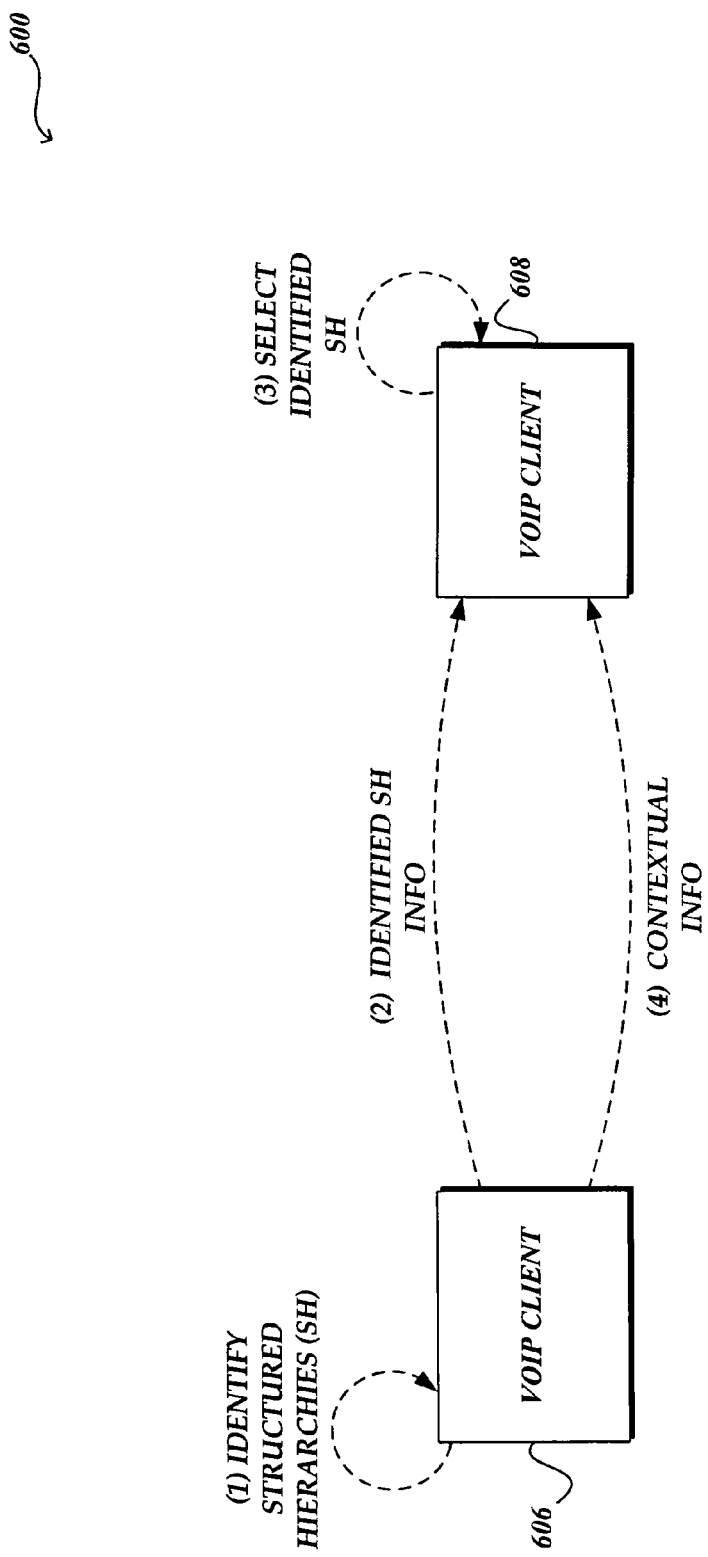
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information in accordance with an embodiment of the present invention is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchies, and the like. Such information will be exchanged between VoIP Client 606 and VoIP Client 608 before the corresponding contextual information is exchanged. Upon receipt of the information about which structured hierarchies are used to carry the contextual information, VoIP Client 608 looks up predefined structured hierarchies (e.g., XML namespace, and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing predefined structured hierarchies, data packets can be transmitted in a manner which is independent of hardware and/or software. Additionally, the use of predefined structured hierarchies enhances the ability to efficiently mine data because the location of potentially relevant information is known.

Upon retrieving the identified structured hierarchies, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
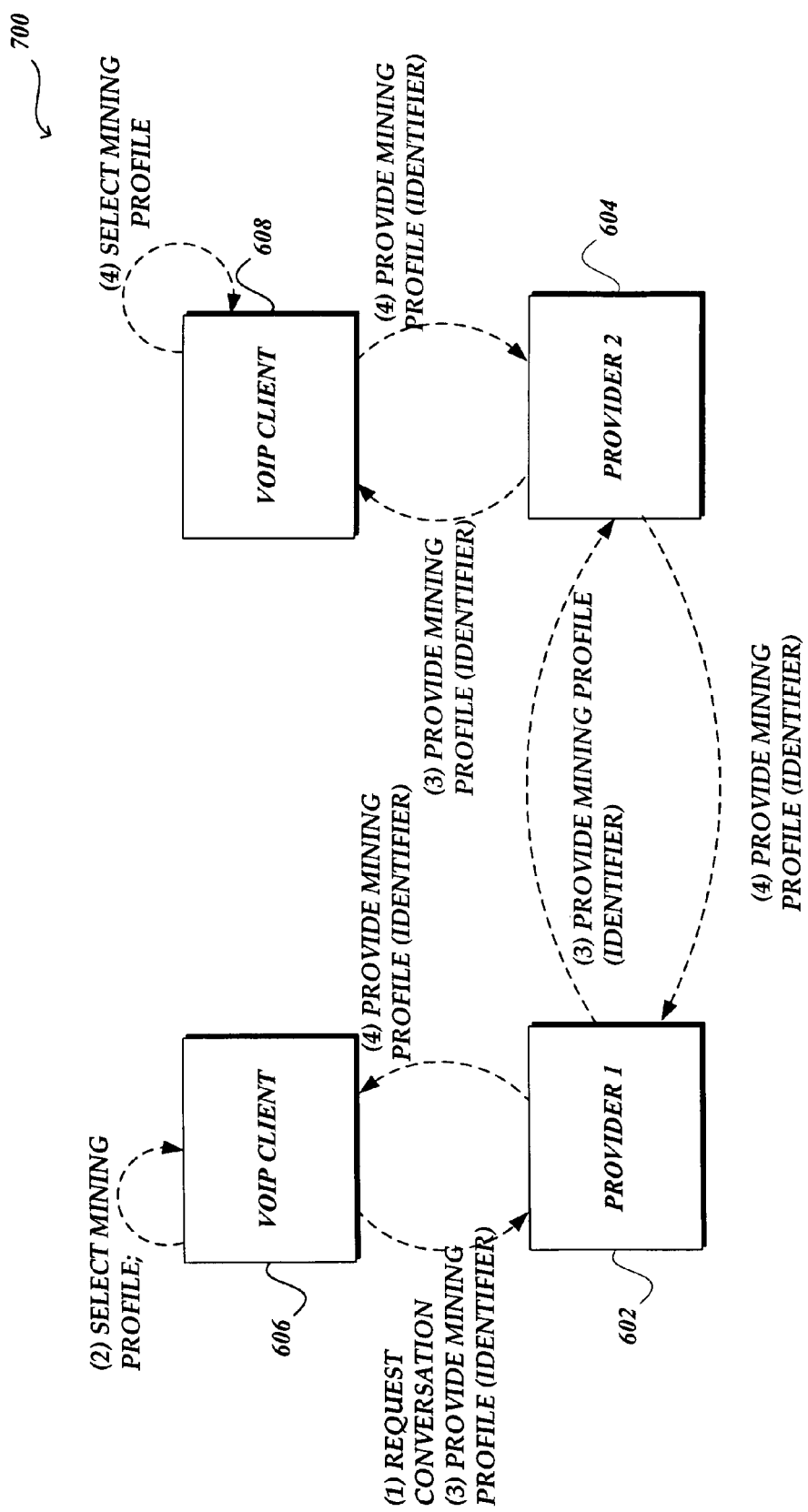
FIG. 7 is a block diagram illustrating interactions between two VoIP clients for exchanging mining profiles in accordance with an embodiment of the present invention.
Figure 8:
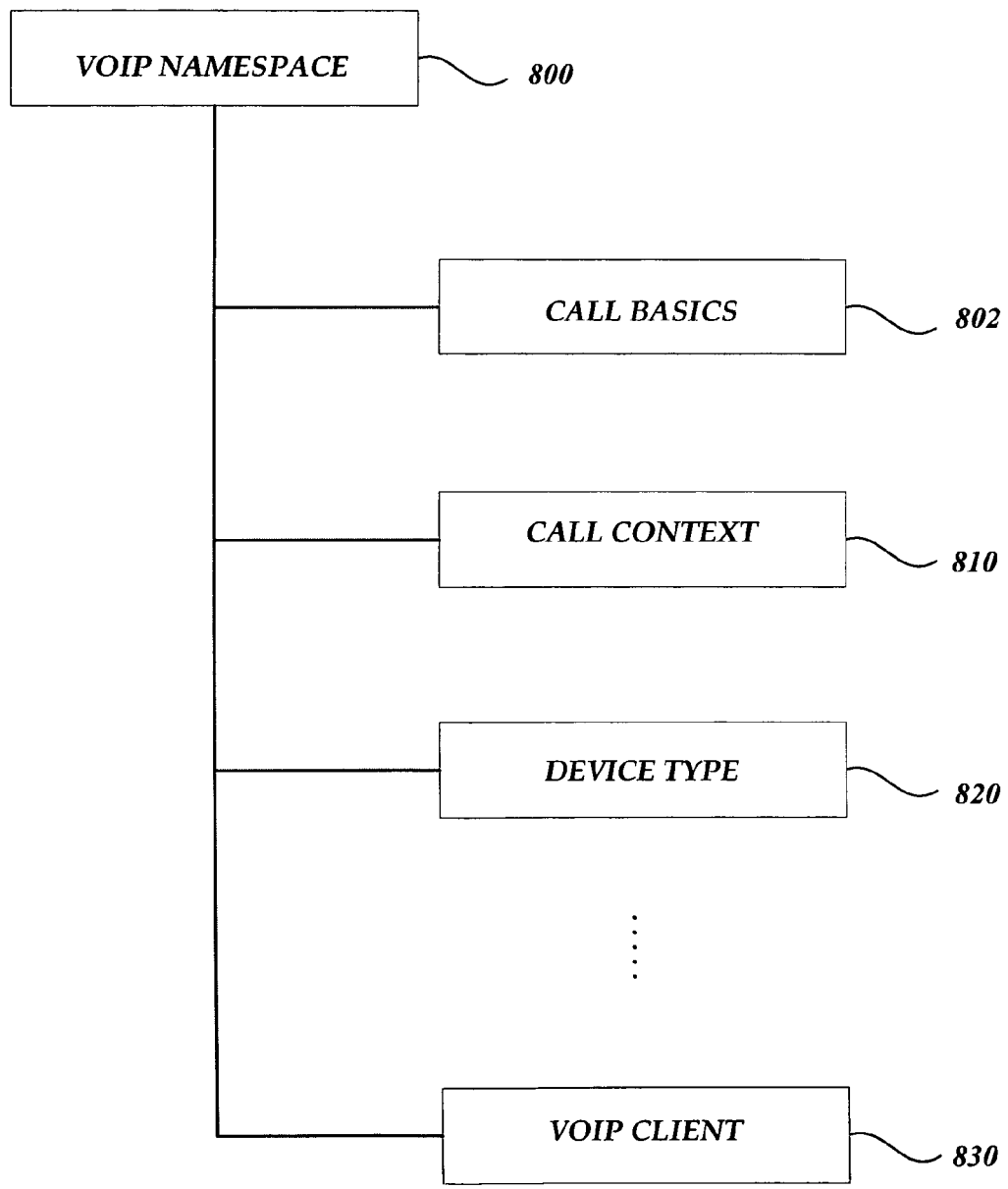
FIGS. 8-12 are block diagrams illustrative of various attributes and classes of structured hierarchies corresponding to VoIP contextual information in accordance with an aspect of the present invention.

Referring to FIG. 7, a block diagram 700 illustrates interactions between two VoIP clients for establishing a conversation channel and selecting mining profiles for use in mining data from the conversation in accordance with an embodiment of the present invention. In one embodiment, VoIP Client 606 upon requesting a connection with VoIP client 608 may selected a mining profile that is to be used during the conversation. For example, if VoIP client 608 is a personal friend, VoIP client 606 may select a mining profile that has been created to mine data relating to common items of interested between the two friends. As part of the connection request and conversation channel setup, the VoIP client 606, via Provider 1 602 and Provider 2 604, may provide the selected mining profile to VoIP client 608. Alternatively, if the clients have previously exchanged mining profiles, the VoIP client 606 may simply identify the selected mining profile by sending a mining profile identifier. In a similar manner, VoIP client 608, during call establishment or at any time during the call, may provide a mining profile (or identifier thereof) of a mining profile selected by VoIP client 608 for mining of data during the conversation to Providers 604, 602 and VoIP client 606.

As discussed below, mining profiles may be exchanged because one or both of the parties may desire to perform further post-processing of data after a conversation has completed. Parties may have limitations as to the types and extent of post-processing that may be performed. These limitations may be contained in an exchanged mining profile and applied to the data packets that are stored for post-processing. In an alternative embodiment, the mining profiles may be maintained and exchanged between Provider 1 602 and Provider 2 604 and that data may be mined and/or stored for later post-processing by the Providers 602, 604. Still further, if no post-processing is to be performed, the mining profiles may not be exchanged. Mining profiles may be selected, used, and exchanged at any point in conversation. Additionally, mining profiles may be changed, replaced, or removed during a conversation. In one embodiment, approval by the individuals participating in the conversation may be required prior to changing or replacing mining profiles during the conversation.

Upon establishment of a conversation channel, during a conversation the VoIP clients 606, 608 and/or Providers 602, 604 may mine the exchanged conversation and contextual data packets for content relevant to the mining profiles. For example, if one of the mining profiles specifies that conversations referring to "golf" are to be mined, an individual using VoIP client 608 mentions that they are going to play golf this Sunday at 1:00 p.m. at Pebble Beach and are inviting the individual using VoIP client 606 to join them, data packets from that digital voice conversation may be mined and further processed. For example, the device that mined the data packet(s) in accordance with the mining profile may obtain weather information for Pebble Beach, Calif. at 1:00 p.m. and provide that information to one or more of the VoIP clients during the conversation. Likewise, another mining profile may be defined to identify calendar items. The same data packet(s) referring to a request to play golf on Sunday at 1:00 p.m. may be mined and a calendaring program may be activated. The VoIP clients may then be presented with a calendar request for Sunday at 1:00 p.m. for golf at Pebble Beach, thereby allowing them to accept, modify, or reject the request and have it placed on their calendars.

In addition to VoIP clients 606 and 608 and/or Providers 602, 604 mining data packets of the conversation, one or both of the clients may have requested or agreed to allow a third party Provider (not shown) to mine data packets from the conversation. For example, if one of the clients has agreed to allow a golf store to mine data packets from conversations, the same sample of data packet(s) may be mined by the third party, and in response, advertisements for golfing attire or equipment may be provided to the clients during and/or after the call. Due to the ability to mine specific portions of a conversation, focused advertisements may be provided. For example, the golf store may also perform a weather search for Sunday at 1:00 p.m. in Pebble Beach, Calif. and determine that it is likely to rain during that time. As a result, the advertisement provided to the clients may include information for rain gear.

Multiple mining profiles may be applied to a conversation and the data packets may be mined and processed real-time with results of the processing being provided to the client during the conversation. Rules may also be placed on the mining profiles, thereby modifying the amount and/or types of data that may be mined. Still further, data packets may be mined and processed at a later point in time (post-processing).

In addition to exchanging mining profiles, as discussed above, structured hierarchies may be specified for use during the conversation that assist in efficient mining of data packets by specifying the structure of the data that is transmitted. A VoIP Client 606 may also define additional classes and/or attributes to the set of predefined structured hierarchies. For example, VoIP Client 606 may identify structured hierarchies with additional attributes and classes for particular contextual information. VoIP Client 606 transmits information corresponding to the identified hierarchies and its additional attributes and classes to Provider 1 602. Provider 1 602 forwards the information corresponding to the identified structured hierarchies and its additional attributes and classes to Provider 2 604. VoIP Client 608 receives the information regarding the identified structured hierarchies and its additional attributes and classes from Provider 2 604. Alternatively, Provider 1 602 forwards such information to VoIP Client 608. VoIP Client 608 updates the locally stored structured hierarchies based on the additional attribute and class information. As a result, the identified structured hierarchies are expanded at VoIP Client 606 and VoIP Client 608. VoIP Client 606 starts sending contextual information represented according to the expanded structured hierarchies to Provider 1 602, which in return sends the received contextual information to Provider 2 604. In one embodiment, upon receipt of the contextual information from Provider 2 604, VoIP Client 608 processes the received contextual information by constructing an instance of the expanded structured hierarchies of the received contextual information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

In a particular embodiment, VoIP Client 606 identifies a XML namespace for contextual information by placing the XML namespace attribute in the start tag of a sending element. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information. As will be appreciated, any technique for identifying the structured hierarchies may be used with embodiments of the present invention. The example of identifying an XML namespace through a start tag is provided as an example only and is not to be considered as limiting.

With reference to FIGS. 8-12, block diagrams illustrative of various classes and attributes of structured hierarchies corresponding to VoIP contextual information are shown. As mentioned above, structured hierarchies are predefined organizational structures for arranging contextual information to be exchanged between two or more VoIP devices. Structured hierarchies can be defined, updated, and/or modified by redefining various classes and attributes. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830, and the like.

Figure 9:
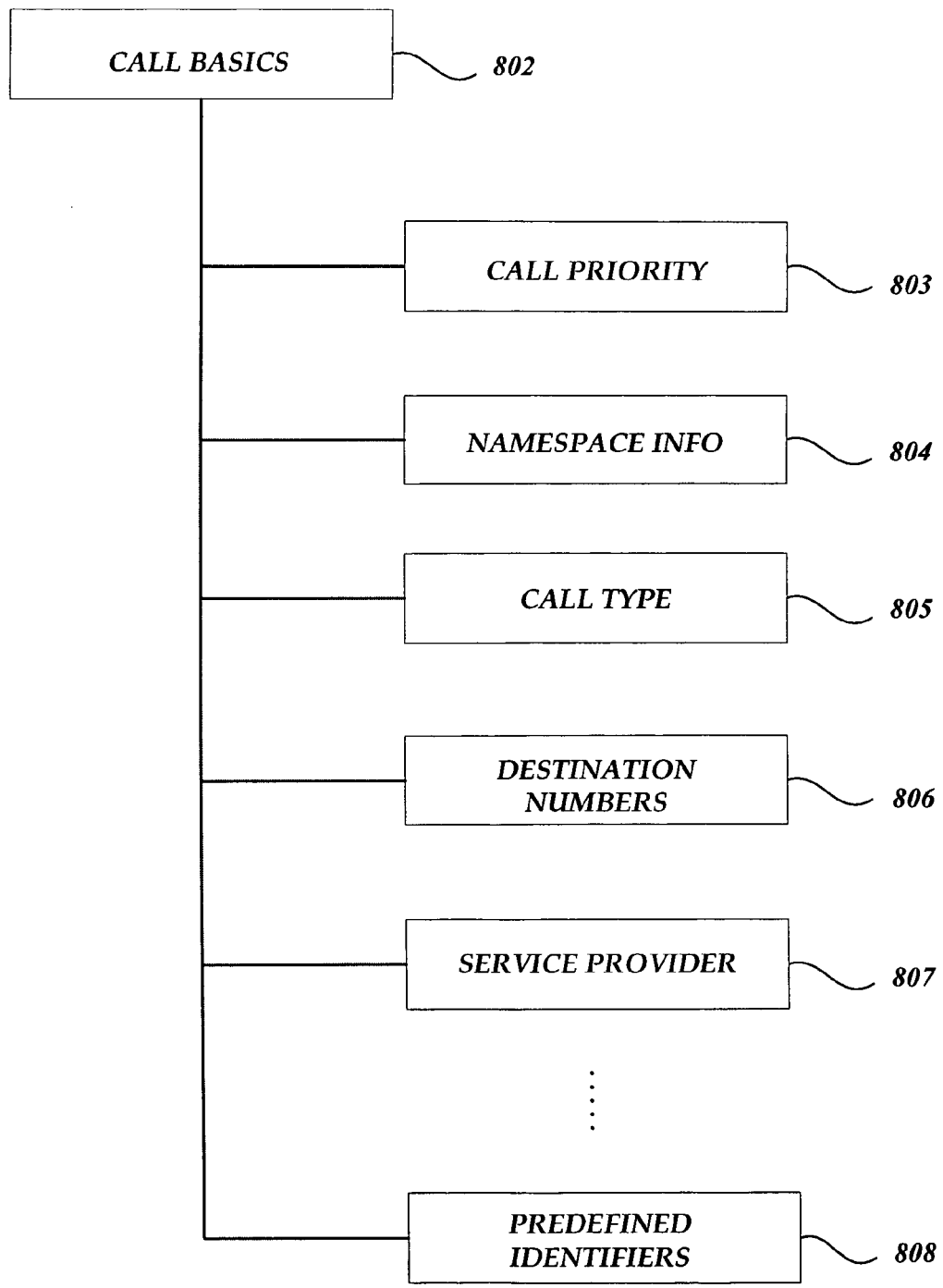

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information, such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a Call Basics Class 802 may be defined as a sub-tree structure of a VoIP Namespace 800, which includes nodes, such as call priority 803, namespace information 804, call type 805, destination numbers 806, service provider 807, predefined identifiers 808, and the like.

Figure 10:
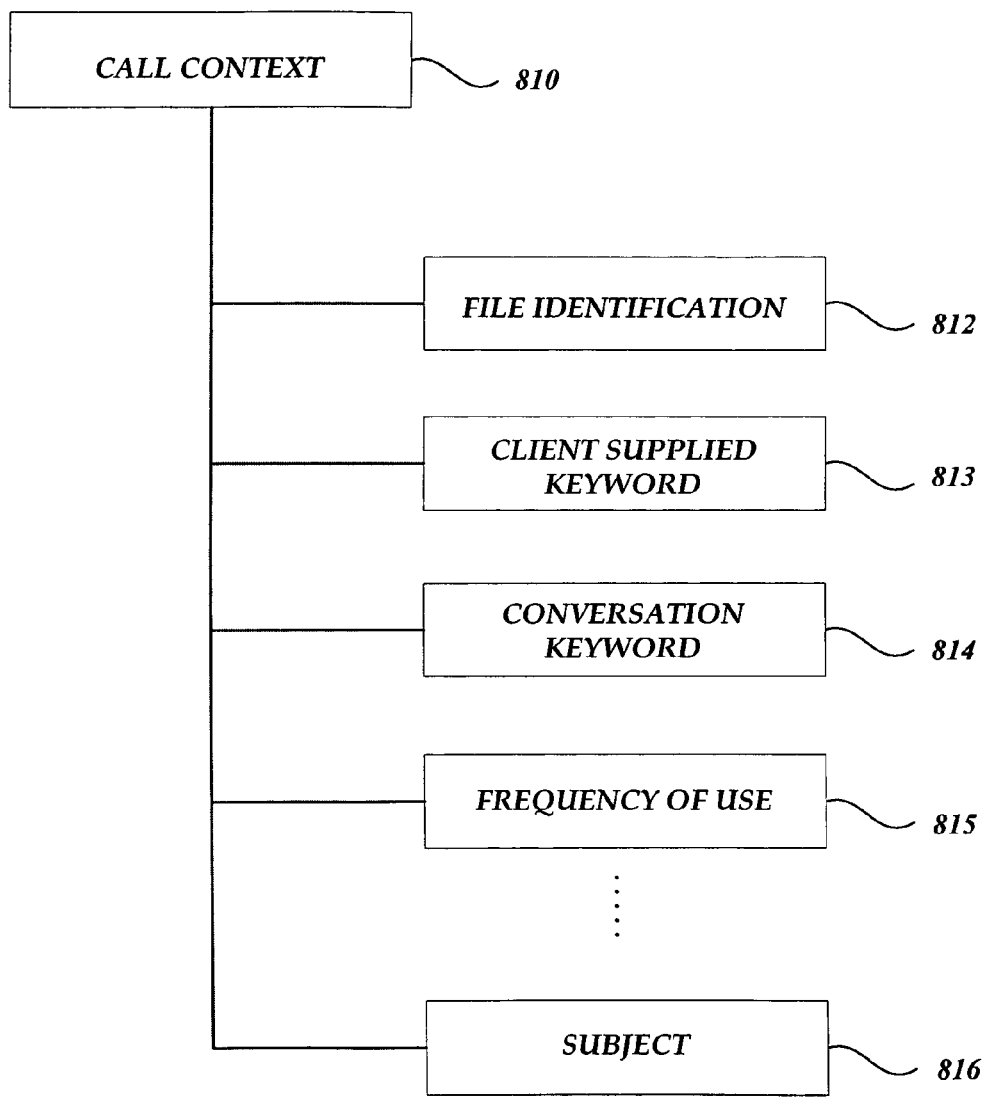

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information, such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
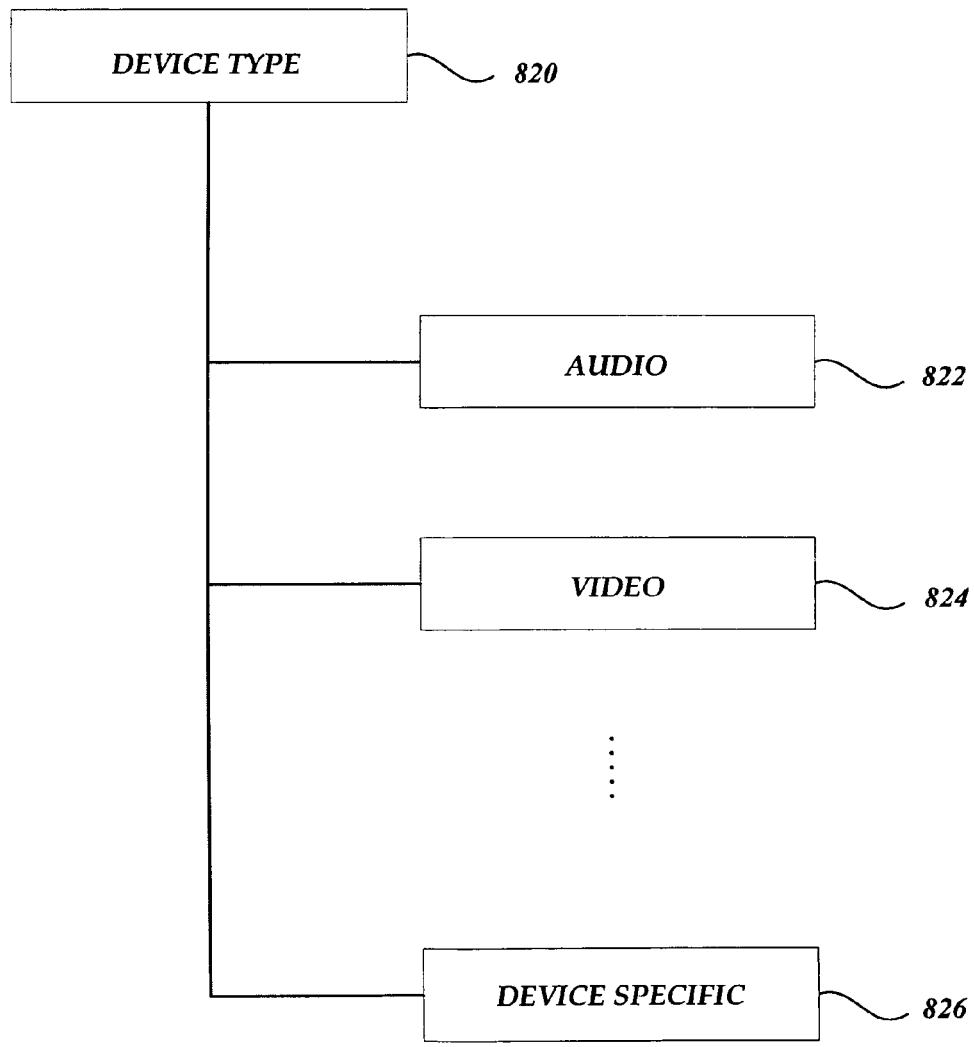

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. Additionally, if system incompatibilities are determined, a translation layer may be added to reconfigure the information being exchanged to enable communication between different types of systems. The contextual information relating to VoIP client devices may further include other device specific information, such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826, and the like.

Figure 12:
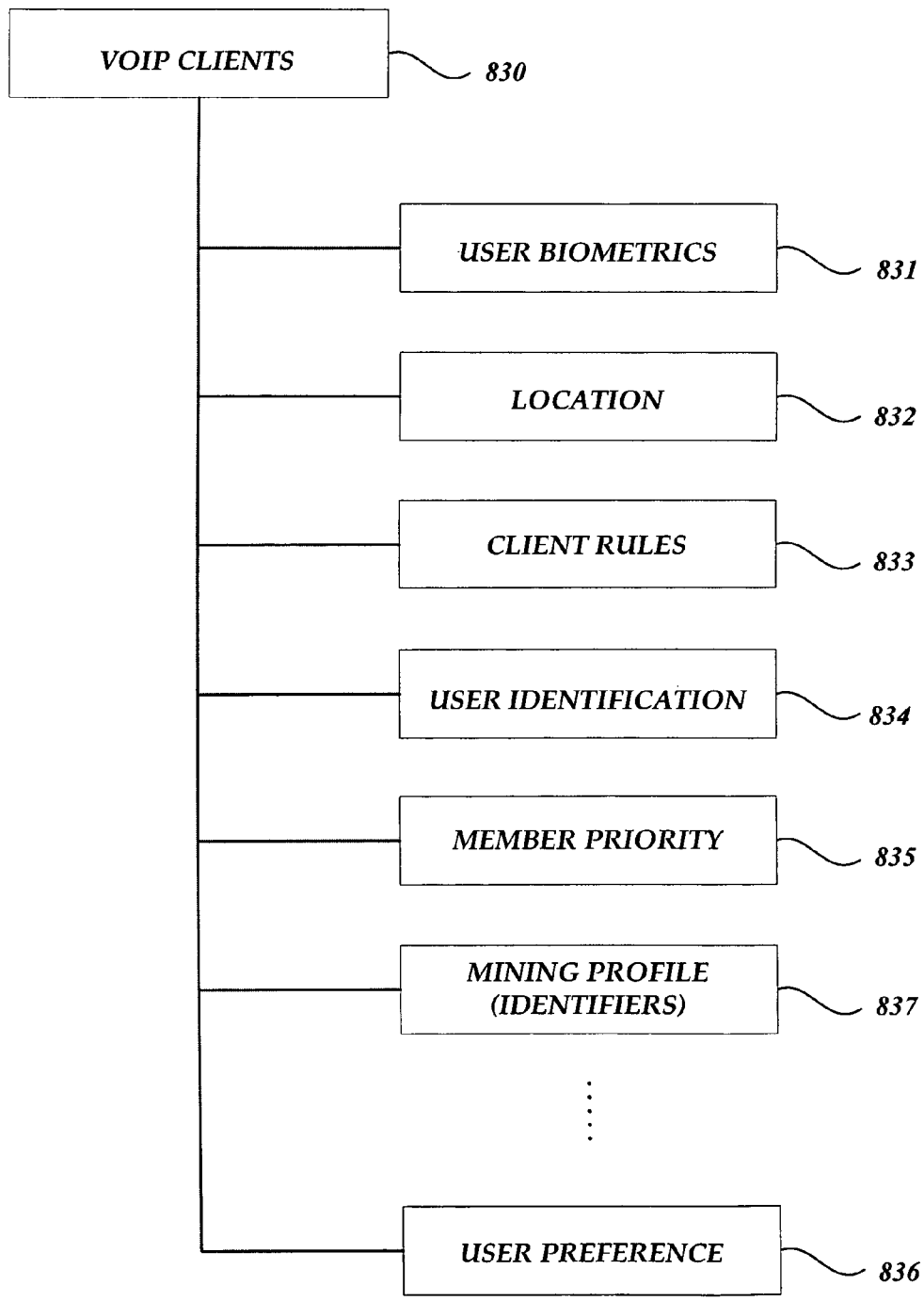

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, biometric information, and mining profile information (e.g., identifying a primary profile or set of mining profiles that are to be used in mining the conversations). A mining profile may include information as to the types of content that is to be mined (mining requirements), how data packets are to be mined (e.g., voice recognition, keyword search, etc.), when the data packets are to be mined (real-time or stored and mined later), the processing that is to be done with mined data packets (e.g., updating a journal, generating tasks, retrieving related information, generating advertisements, etc.), when processing is to be done (real-time or later) and the types of content that is allowed to be mined from the conversation.

The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/ triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, mining profile identification 837, and the like.

Figure 13:
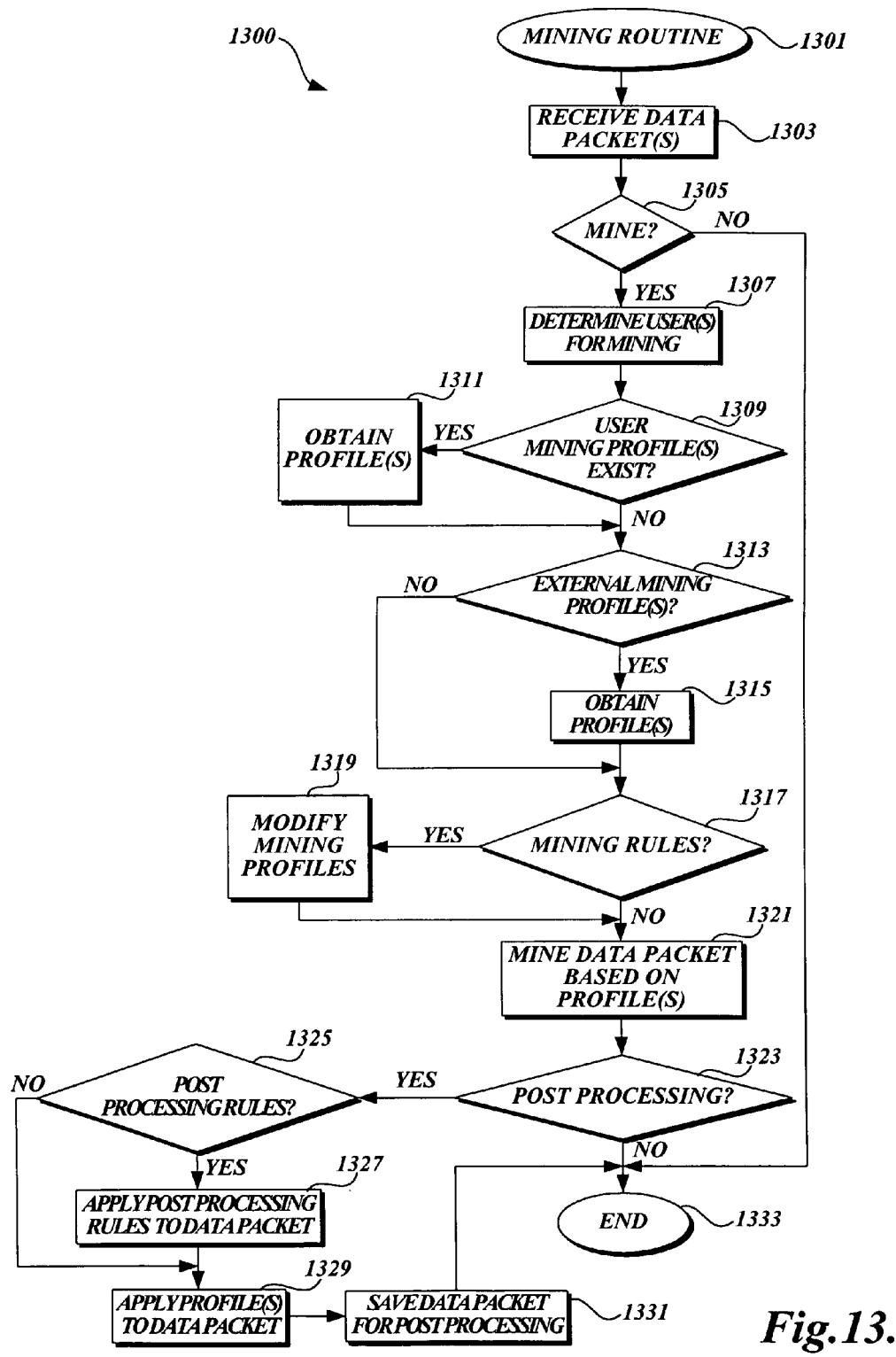
FIG. 13 is a flow diagram of a mining routine for mining a digital voice conversation in accordance with an aspect of the present invention.

FIG. 13 is a flow diagram of a mining routine for mining data packets from a digital voice conversation in accordance with an embodiment of the present invention. The mining routine 1300 begins at block 1301. At block 1303, a data packet from a voice conversation is received. As will be appreciated, the mining routine 1300 may be performed using a single data packet or utilizing a group of data packets. At decision block 1305, a determination is made as to whether that data packet is to be mined. As discussed above, a data packet may include a mining identifier 513 (FIG. 5) in the header of the data packet identifying that the payload of the data packet may include content worth mining. Alternatively, any technique for identifying data packets that may include content worth mining may be utilized with embodiments of the present invention. For example, if the data packet is of a particular size, thereby indicating that it may contain useful content worth mining, the data packet may be selected for mining at decision block 1305.

If it is determined at decision block 1305 that the received data packet is to be mined, at block 1307, client profiles for mining are determined. As discussed above, a client may create one or more profiles for use in a digital voice conversation that identify the types of content that is to be mined. For example, a client may create a personal mining profile that is used in personal conversations. Such a personal mining profile may include topics or categories identifying the types of content that is to be mined from the conversation itself. For example, if a client is interested in shoes, the personal mining profile may include an identifier to search for keywords or utilize speech recognition to identify conversations that include references to shoes or types of shoes. Additionally, contextual information of a conversation may be searched according to the structured hierarchies discussed above and the relevant portions of the contextual information utilized to determine if the content or the structure of the data packet includes references to shoes.

At decision block 1309, a determination is made as to whether one or more client mining profiles that are to be used to mine the data packet received at block 1303 exist. If it is determined at block 1309 that one or more client mining profiles do exist, at block 1311, those profiles are obtained. At decision block 1313, either after the one or more profiles are obtained at block 1311, or if it is determined at decision block 1309 that no profiles exist, it is determined whether external mining profiles that are to be used to mine the data packet received at block 1303 exist. External profiles may be, for example, but not limited to, profiles generated by clients or others that are to be used in mining the conversation. For example, a client may request a third party to mine conversations for that individual for particular content of interest. Additionally, external mining profiles may include, but are not limited to, security profiles managed by service providers, the government, companies, etc.

If it is determined at decision block 1313 that external mining profiles are to be used in mining the received data packet, at block 1315, those profiles are obtained. Upon obtaining the external mining profiles at block 1315, or if it is determined at decision block 1313 that there are no external mining profiles, at decision block 1317, it is determined whether there are any mining rules that are to be applied to the mining. Mining rules may be, for example, rules specified by a company from which a call is being generated. For example, if a client is making a call from a company, the company may have mining rules that do not allow any mining of conversations originating from that company or including conversations within that company. Alternatively, the mining rules may specify when calls may be made from a particular location, such as a company. If it is determined at decision block 1317 that mining rules exist, at block 1319, the mining profiles obtained at block 1311 and block 1315 are modified, based on those mining rules.

At block 1321, after the obtained mining profiles are modified at block 1319, or if it is determined at decision block 1317 that there are no mining rules, the data packets received at block 1303 is mined based on the obtained profiles. For example, if the mining profile specifies that a data packet (or a group of data packets) is to be mined using voice recognition and searching for keywords, and if content is identified that includes the relevant keywords, it may be marked or otherwise identified as a "mined data packet" that is to be further processed. Processing of mined data packets is described in further detail with respect to FIG. 14.

In addition to mining data packets during a conversation, it may be determined at decision block 1323 as to whether any post-processing of the conversation or mined data packet is to be performed. If it is determined at decision block 1323 that post-processing is to be performed, at decision block 1325, it is determined whether there are any post-processing rules. If it is determined at decision block 1325 that there are post-processing rules, at block 1327 those post-processing rules are applied to the mined data packet. Post-processing rules may be, for example, rules as to what type of post-processing may be performed on the data packet, what may be done with the content that is mined from the data packet during post-processing, etc. However, if it is determined at decision block 1325 that there are no post-processing rules, or after post-processing rules are applied at block 1327, the profiles obtained at block 1311 and block 1315, which were possibly modified at block 1319, are applied and associated with the mined data packet that is to be post-processed. Data packets that are to be post-processed are associated with mining profiles and rules so that those profiles and rules can be identified and obtained when the post-processing of the data packets occurs. Alternatively, the mining profile may not be applied to the mined data packet. At block 1331 the mined data packets, post-processing rules, and optionally the applied profiles, are saved for post-processing. After the data packets and appropriate information is saved at block 1331 for post-processing, if it is determined at block 1323 that no post-processing is to be accomplished, or if it is determined at decision block 1305 that the received data packet is not to be mined, the VoIP mining routine 1300 completes, as illustrated by block 1333.

Figure 14:
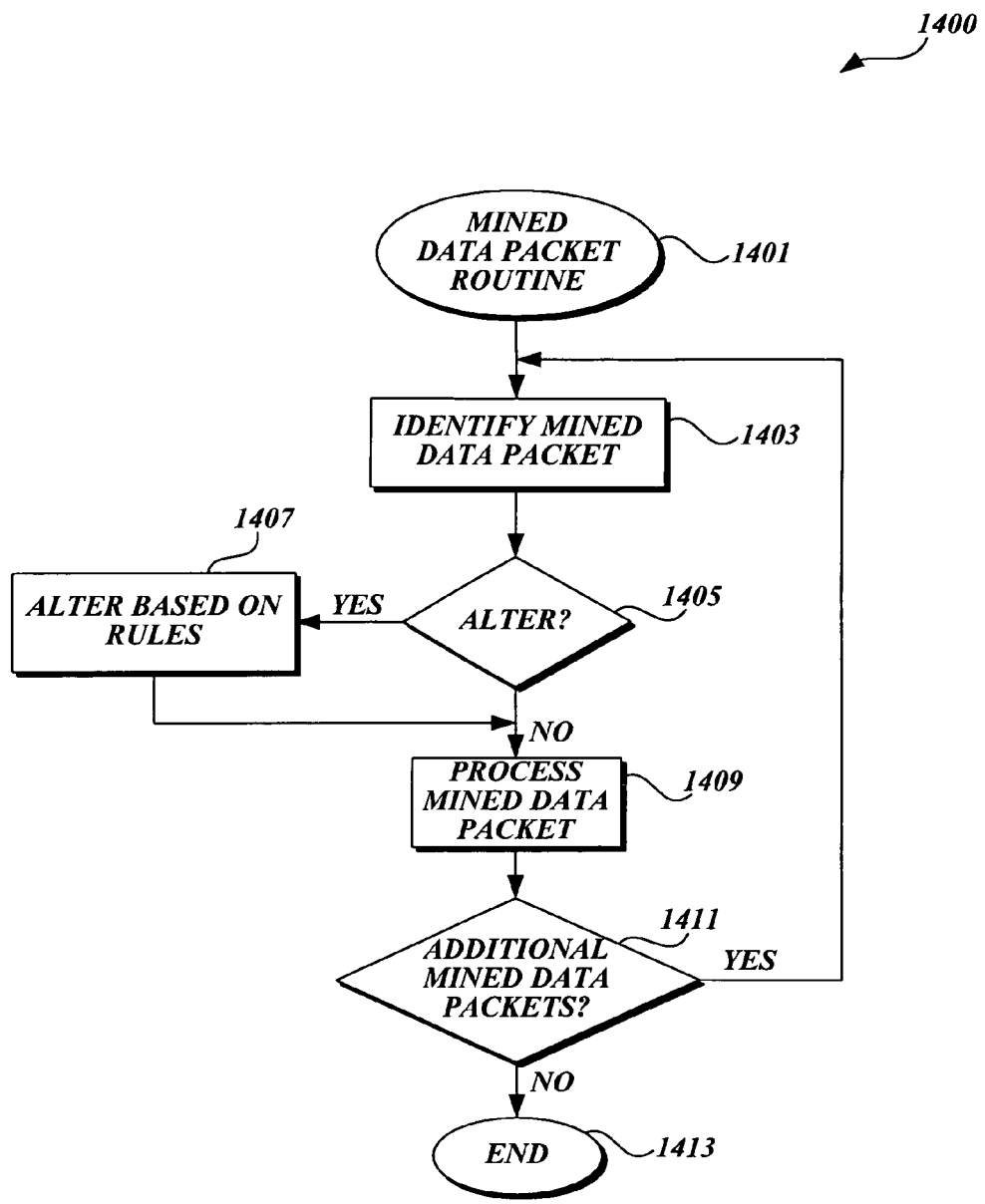
FIG. 14 is a flow diagram of a mined data routine for processing data packets that have been mined according to an embodiment of the present invention.

FIG. 14 is a flow diagram of a mined data packet routine or processing a data packet that has been mined from a digital voice conversation in accordance with an embodiment of the present invention. The mined data packet routine 1400 begins at block 1401. At block 1403, a data packet(s) that has been mined from a digital voice conversation is identified. Similar to FIG. 13, the mined data packet routine 1400 may be performed on a single data packet or a group of data packets. Additionally, as discussed above, mined data packets may contain conversation data or contextual data. At decision block 1405, a determination is made as to whether the mined data packet, or the content of the mined data packet is to be altered. If it is determined at decision block 1405 that the mined data packet/content is to be altered, at block 1407, that mined data packet/content is altered. Mined data packets or the content may be altered based on rules applied to the mining profiles and/or based on post-processing rules. For example, a rule may specify that all mined data packets containing content relating to trade secret information of a corporation are to be removed from the conversation and forwarded to an officer of the corporation. Any type of alteration may be performed on mined data packets and/or the content of those packets including, but not limited to, removing the data packet from the conversation, replacing the content of the data packet with other content, storing the data packet for future use, recording the data packet or the content of the data packet, etc.

After the mined data packet or content has been altered at block 1407, or if it is determined at block 1405 that the data packet or content is not to be altered, at block 1409, the mined data packet is processed in any of a variety of ways. Mined data packets may be processed in a multitude of ways to provide additional services to a client. For example, content from a mined data packet may be used to feed another application or service, such as a diary, a task list, etc., that may be later accessed by a client to review the conversation or obtain additional information. Likewise, content from the mined data packet may be used to obtain other information related to the content. For example, referring again to the example of mining data packets containing content related to shoes, if the content was a conversation about Nike® shoes, a mining service provider may obtain additional information regarding Nike® shoes. For example, additional information may be sales of Nike® shoes, locations for purchasing Nike® shoes, quality of Nike® shoes, etc. This information may be stored with the conversation for later viewing by a client and/or provided to the client during the conversation.

In addition to feeding other applications, content from mined data packets may be used to redirect portions of a particular conversation. For example, if the content refers to a personal portion of conversation and is a high quality video, but the receiving device is a corporate device with no video capabilities, the video portion of that conversation may be rerouted to a different client device that provides the necessary capabilities and viewed or stored for later viewing on that device. Additionally, a network may utilize mined data packets for load balancing to reroute or reprocess conversations based upon the contents and size of those conversations as specified by the mined data packets.

As will be appreciated by one skilled in the relevant art, there is an endless number of processing techniques and varieties that may be used to process mined data packets and provide additional services to clients. Accordingly, the examples provided herein are for illustration only and not to be construed as limiting.

After the mined data packet is processed at block 1409, at decision block 1411, a determination is made as to whether additional mined data packets have been received that are to be processed. If it is determined at decision block 1411 that additional mined data packets exists for processing, the routine returns to block 1403 and continues. However, if it is determined at decision block 1411 that there are no additional mined data packets to be processed, the routine 1400 completes at block 1413.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for mining data packets from a digital voice conversation comprising:
   receiving, at a first client, a request from a second client to establish a digital voice conversation over a communication channel that is used to transmit and receive data packets comprising contextual data packets and conversational data packets; wherein the conversational data packets are for conversation data and the contextual data packets are for data other than the conversation data;
   selecting, by the first client, a mining profile for use in mining at least one of contextual data packets and conversational data packets of the digital voice conversation, wherein the mining profile identifies at least one type of content that is to be mined and processing to be performed on the mined content;
   determining that a mining profile rule exists relating to the conversation;
   modifying the selected mining profile according to the mining profile rule;
   receiving, by the first client, a structured hierarchy defining an organization of the contextual data packets;
   receiving, by the first client over the communication channel, one or more contextual data packets organized in a structure defined by the structured hierarchy and one or more conversational data packets;
   during the digital voice conversation, determining, based in part on the at least one type of content identified in the mining profile, whether at least one of the received contextual data packets and conversational data packets are to be mined;
   mining, by the first client, the determined data packets based on the selected mining profile and the structured hierarchy; and
   processing the mined data packets based on the selected mining profile.

2. The method of claim 1, further comprising:
   in response to a determination that the data packet includes content identified in to the mining profile, indicating that the data packet is a mined data packet.

3. The method of claim 1, wherein processing further comprises:
   processing the data packet to obtain additional information relating to content of the data packet.

4. The method of claim 1, further comprising:
   storing the data packet with the mining profile for post-processing.

5. The method of claim 4, further comprising:
   identifying post-processing rules; and
   storing the post-processing rules with the mining profile and the data packet for post-processing.

6. The method of claim 1, wherein the mining profile further defines how to process the content once it is mined.

7. The method of claim 1, wherein the mining profile specifies a type of processing to be performed on the data packet.

8. The method of claim 1, wherein selecting a mining profile includes selecting a plurality of mining profiles.

9. A computer-readable memory having computer executable components for processing mined data, comprising:
- a mining profile component selecting a mining profile for use in mining at least one of contextual data packets and conversational data packets of a digital voice conversation, determining that a mining profile rule exists relating to the conversation, and modifying the selected mining profile according to the mining profile rule, wherein the mining profile identifies at least one type of content that is to be mined, processing to be performed on the mined content, and alteration information;
- a structured hierarchy component selecting a structured hierarchy defining an organization of the contextual data packets;
- a mined data packet management component determining, during the digital voice conversation and based in part on the at least one type of content identified in the mining profile, one or more contextual data packets and conversational data packets to be mined;
- a mined data packet alteration component altering content of mined data packets based on alteration information included in the mining profile; and
- a mined data packet processing component performing processing of mined data packets as identified in the mining profile.

10. The computer-readable memory of claim 9, wherein the mined data packet alteration component alters content of data packets based on rules applied to a mining profile.

11. The computer-readable memory of claim 10, wherein the rules are applied by a service provider.

12. The computer-readable memory of claim 9, wherein content may be altered by removing the data packet from a digital voice conversation, storing the data packet, replacing the content, or forwarding the data packet.

13. The computer-readable memory of claim 9, wherein the mined data packet processing component provides real-time information to an individual related to a content of the mined data packet.

14. The computer-readable memory of claim 9, wherein the processing of the mined data packet is done real-time.

15. The computer-readable memory of claim 9, further comprising:
- a post-processing component for storing mined data packets with post-processing rules.

16. A system including:
- at least one processor; and
- a memory operatively coupled to the at least one processor and including instructions that, when executed by the at least one processor, cause the at least one processor to perform a method, the method comprising:
  - receiving, at a first client, a request from a second client to establish a digital voice conversation over a communication channel that is used to transmit and receive data packets comprising contextual data packets and conversational data packets; wherein the conversational data packets are for conversation data and the contextual data packets are for data other than the conversation data;
  - selecting, by the first client, a mining profile for use in mining at least one of contextual data packets and conversational data packets of the digital voice conversation, wherein the mining profile identifies at least one type of content that is to be mined and processing to be performed on the mined content;
  - determining that a mining profile rule exists relating to the conversation;
  - modifying the selected mining profile according to the mining profile rule;
  - receiving, by the first client, a structured hierarchy defining an organization of the contextual data packets;
  - receiving, by the first client over the communication channel, one or more contextual data packets organized in a structure defined by the structured hierarchy and one or more conversational data packets;
  - during the digital voice conversation, determining, based in part on the at least one type of content identified in the mining profile, whether at least one of the received contextual data packets and conversational data packets are to be mined;
  - mining, by the first client, the determined data packets based on the selected mining profile; and
  - processing the mined data packets based on the selected mining profile.

17. The system of claim 16, wherein a third party performs processing of the mined data packets.

18. The system of claim 17, wherein the third party is requested to mine digital voice conversations for particular items of content.

19. The system of claim 16, wherein received data packets are identified for processing based on a header of the data packet.

* * * * *